United States Patent
Mouly

(10) Patent No.: US 12,013,027 B2
(45) Date of Patent: Jun. 18, 2024

(54) PLANET CARRIER FOR A SPEED REDUCTION GEAR OF AN AIRCRAFT TURBOMACHINE

(71) Applicant: SAFRAN TRANSMISSION SYSTEMS, Colombes (FR)

(72) Inventor: Guillaume Pierre Mouly, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/847,511

(22) Filed: Jun. 23, 2022

(65) Prior Publication Data
US 2022/0412454 A1    Dec. 29, 2022

(30) Foreign Application Priority Data

Jun. 24, 2021 (FR) ...................................... 2106768

(51) Int. Cl.
*F16H 57/08* (2006.01)
*F02C 7/36* (2006.01)
*F16H 1/28* (2006.01)

(52) U.S. Cl.
CPC ............ *F16H 57/082* (2013.01); *F02C 7/36* (2013.01); *F05D 2260/40311* (2013.01); *F16H 1/28* (2013.01)

(58) Field of Classification Search
CPC . F16H 57/082; F16H 1/28; F02C 7/36; F05D 2260/40311
See application file for complete search history.

(56) References Cited

U.S. PATENT DOCUMENTS

| | | | | |
|---|---|---|---|---|
| 5,466,198 A | * | 11/1995 | McKibbin | ................. F02C 7/36 475/346 |
| 2003/0162630 A1 | * | 8/2003 | Poulin | .................... F16H 57/082 475/346 |
| 2014/0309078 A1 | | 10/2014 | Curti et al. | |
| 2017/0335946 A1 | * | 11/2017 | Muldoon | .............. F16H 57/082 |
| 2017/0338705 A1 | * | 11/2017 | Klassen | ................. H02K 7/086 |
| 2019/0301593 A1 | * | 10/2019 | Lemoine | ............... F16H 57/082 |

FOREIGN PATENT DOCUMENTS

| | | |
|---|---|---|
| DE | 10 2019 127546 A1 | 4/2021 |
| EP | 2 773 871 B1 | 9/2014 |
| FR | 1 379 451 A | 11/1964 |
| FR | 3036763 A1 * | 12/2016 |

OTHER PUBLICATIONS

France Search Report mailed Feb. 15, 2022, issued in Application No. FR2106768, filed Jun. 24, 2021, 2 pages.

* cited by examiner

*Primary Examiner* — Stacey A Fluhart
*Assistant Examiner* — Aimee Tran Nguyen
(74) *Attorney, Agent, or Firm* — CHRISTENSEN O'CONNOR JOHNSON KINDNESS PLLC

(57) ABSTRACT

A planet carrier for a speed reduction gear of a turbomachine has a main axis X and includes a cage carrier with an annular row of axial fingers around the axis X, which carry first connecting elements. The carrier further includes a cage having at its periphery housings and second connecting elements that are mounted in the housings and that cooperate with the first connecting elements to form connections between the cage carrier and the cage, which allow at least one degree of freedom. The cage comprises two shells that are axially fastened to each other and separated from each other by a plane. The housings are formed respectively in the shells.

13 Claims, 6 Drawing Sheets

PLANET CARRIER FOR A SPEED REDUCTION GEAR OF AN AIRCRAFT TURBOMACHINE

CROSS-REFERENCE TO RELATED APPLICATION

This application claims priority to FR 2106768, filed Jun. 24, 2021, the disclosure of which is hereby expressly incorporated by reference herein in its entirety.

TECHNICAL FIELD

The present disclosure relates to a planet carrier for a speed reduction gear of an aircraft turbomachine, as well as a speed reduction gear for an aircraft turbomachine.

BACKGROUND

The prior art includes, in particular, the documents FR-A1-2 987 416, FR-A1-2 853 382, FR-A1-3 041 054, FR-A1-3 052 113, FR-A1-3 073 915, FR-A1-3 084 428, U.S. Pat. No. 5,466,198A and FR 1,379,451A.

The role of a mechanical reduction gear is to change the speed and torque ratio between the input and output axle of a mechanism.

The newer generations of dual flow turbomachine, in particular, those with high bypass ratios, comprise a mechanical reduction gear to drive the shaft of a fan. Typically, the purpose of the reduction gear is to transform the so-called fast rotational speed of the shaft of a power turbine into a slower rotational speed for the shaft driving the fan.

Such a reduction gear comprises a central pinion, called sun gear, a ring gear and pinions called planet gears, which are engaged between the sun gear and the ring gear. The planet gears are held by a frame called a planet carrier. The sun gear, the ring gear and the planet carrier are planetary gears because their axes of revolution coincide with the longitudinal axis of the turbomachine. The planet gears each have a different axis of revolution equally spaced on the same operating diameter around the axle of the planetary gears. These axes are parallel to the longitudinal axis of the turbomachine.

There are several architectures of reduction gear. In the prior art of dual flow turbomachine, the reduction gears are of the planetary or epicyclic type. In other similar applications, there are so-called differential or "compound" architectures.

- In a planetary reduction gear, the planet carrier is fixed and the ring gear is the output shaft of the device, which turns in the opposite direction to the sun gear.
- On an epicyclic reduction gear, the ring gear is fixed and the planet carrier is the output shaft of the device which rotates in the same direction as the sun gear.
- On a compound reduction gear, no element is fixed in rotation. The ring gear rotates in the opposite direction to the sun gear and the planet carrier.

The reduction gears can be composed of one or more meshing stages. This engagement is achieved in different ways such as by contact, friction or magnetic field. There are several types of contact meshing, such as straight toothing or herringbone toothing.

The planet carrier can be a monobloc or a cage and cage carrier. The cage comprises an internal cavity in which the sun gear, the planet gears and the guide bearings of these planet gears are housed. The sun gear comprises internal splines for coupling to a first shaft of the turbomachine and the cage carrier includes a cylindrical portion comprising external splines for coupling to another shaft.

The connection of the cage to the cage carrier is generally rigid. Alternatively, a technology can be envisaged in which the cage is connected to the cage carrier by "flexible" connections, such as described in FR-A1-2 853 382. In such a case, the cage carrier comprises an annular row of axial fingers which carry first connecting elements. These first connecting elements cooperate with second connecting elements mounted in housings of the cage to form the flexible connections between the cage carrier and the cage, which allow at least one degree of freedom.

It has been proposed that these flexible connections are made by ball joints, with the fingers carrying ball joints through which cylindrical pins extend into the housings in the cage.

In operation, when the planet carrier is torqued, the fingers will flex and transmit the torque to the cage. The ball joints ensure that the deflection of the fingers is not transmitted to the pin. The cage carrier keeps the cage in its plane of symmetry in order to balance the recovery of forces on both sides of the planet gears.

Sometimes it is not possible to mount the planet gears in the cage either from the inside or the outside of the cage, which means that the cage has to be cut into several pieces in order to mount the planet gears before closing the set of the pieces in the cage.

A solution to this problem could be to separate one side of the cage from the rest of the cage and provide annular flanges for fastening on the side and the rest of the cage respectively. However, these flanges and the means for fastening (screws) these flanges would have to be sized to carry at least 50% of the load of the reduction gear, which would result in bulky and heavy flanges and means for fastening these flanges being constrained in operation.

The present disclosure provides an improvement which provides a simple, effective and economical solution to at least a part of the above problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The disclosed subject matter relates to a planet carrier for a turbomachine speed reduction gear, the planet carrier having a main axis X and comprising:
- a cage carrier comprising an annular row of axial fingers about the axis X, which carry first connecting elements, and
- a cage comprising an internal cavity configured to contain a central sun gear of axis X of rotation and an annular row of planet gears disposed about the axis X and meshed with said sun gear and with a ring gear for surrounding the cage, the cage comprising at its periphery housings and second connecting elements which are mounted in said housings and which cooperate with the first connecting elements to form connections between the cage carrier and the cage, which allow at least one degree of freedom,
- the cage comprising two shells which are axially fixed to each other and separated from each other by a plane, said housings being formed respectively in said shells, each of said housings comprising a first orifice formed in a first of the shells and a second orifice formed in a second of the shells, the first and second orifices being aligned;

characterised in that the shells comprise radial tabs axially supporting each other or axially spaced from each other and in which said first and second orifices are respectively formed.

The present disclosure thus proposes to form the mounting housings for the second connecting elements in the two shells of the cage. Contrary to the solution mentioned in the foregoing, which consists of dissociating one of the sides of the cage from the rest of the cage and in which the housings would be formed only in the rest of the cage, the housings are formed here in the two shells of the cage, which enables these shells to each take up a part of the forces which pass between the cage and the cage carrier in operation. The two shells thus support the second connecting elements.

The disclosed subject matter is compatible with:
a single-stage or multi-stage reduction gear;
a planetary, epicyclic or differential reduction gear; and
straight, helical or chevron toothings.

The planet carrier according to the present disclosure may comprise one or more of the following features, taken in isolation from each other, or in combination with each other:
said plane is substantially perpendicular to said axis X;
said housings are oriented parallel to said axis X;
each of the shells defines an axial part of said cavity and is intended to receive an axial part of each of the planet gears;
said plane is a plane of connection or axial support for the shells;
the shells are identical and said plane is also a plane of symmetry;
the shells comprise radial tabs axially supporting each other and the tabs are clamped together axially by screws which extend parallel to said axis and pass through passages of these tabs;
the connections between the cage carrier and the cage are of the ball joint type, said fingers carrying ball joints which are housed in rings mounted in said first and second orifices;
a first nut is screwed to an axial end of each of said fingers and secures the ball joint carried by that finger, and a second nut is screwed to a free end of the ring for mounting this ball joint and secures that ring to the shells;
the shells comprise radial tabs axially spaced apart and the connections between the cage carrier and the cage are of the ball joint type, said fingers carrying rings in which are housed ball joints carried by inserts mounted in the said first and second orifices;
the connections between the cage carrier and the cage are of the ball joint type, said fingers carrying balls which are housed in rings carried by inserts mounted in said first and second orifices;
said inserts are shrunk into said first and second orifices;
each of said ball joints has an axially or radially oriented main axis Y.

The present disclosure also relates to a mechanical reduction gear for an aircraft turbomachine, comprising a planet carrier as described above, a sun gear mounted in said cavity and centered on said axis X, a ring gear extending around the sun gear, and planet gears mounted in said cavity and meshed with the sun gear and ring gear.

The present disclosure further relates to a turbomachine, in particular an aircraft turbomachine, comprising a reduction gear as described above.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Figure 1:
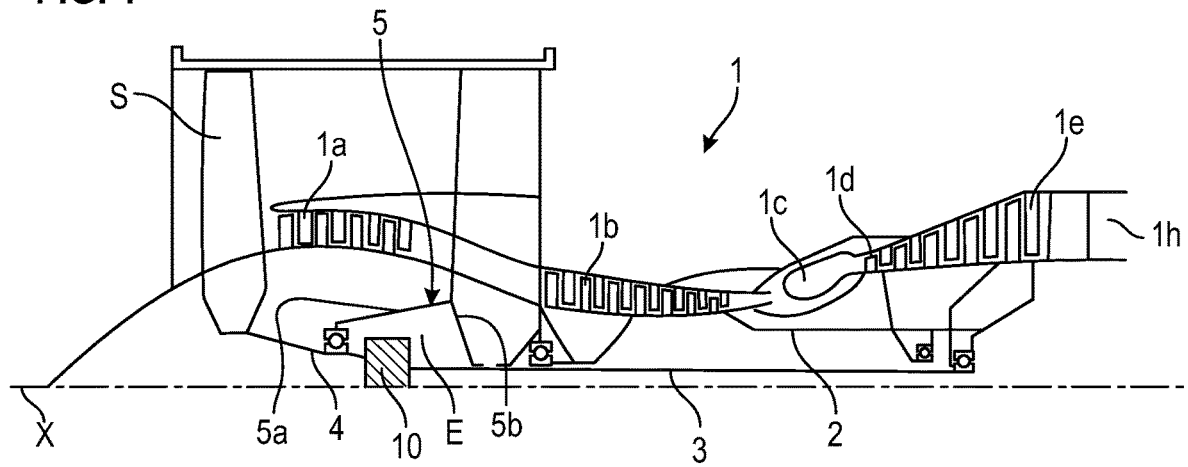
FIG. 1 is a schematic axial sectional view of a turbomachine using the an embodiment of the present disclosure.

FIG. 1 describes a turbomachine 1 which conventionally comprises a fan S, a low-pressure compressor 1a, a high-pressure compressor 1b, an annular combustion chamber 1c, a high pressure turbine 1d, a low pressure turbine 1e and an exhaust nozzle 1h. The high-pressure compressor 1b and the high-pressure turbine 1d are connected by a high-pressure shaft 2 and together form a high-pressure (HP) body. The low-pressure compressor 1a and the low-pressure turbine 1e are connected by a low-pressure shaft 3 and together form a low-pressure (LP) body.

The fan S is driven by a fan shaft 4 which is connected to the LP shaft 3 by means of a reduction gear 10. This reduction gear is usually of the planetary or epicyclic type. Although the following description refers to a planetary or epicyclic reduction gear, it also applies to a mechanical differential in which its three essential components, namely the planet carrier, the ring gear and the sun gear, are mobile in rotation, the rotational speed of one of these components being dependent, in particular, on the speed difference of the other two components.

The reduction gear 10 is positioned in the upstream part of the turbomachine. A fixed structure comprising schematically, here, an upstream part 5a and a downstream part 5b which makes up the engine casing or stator 5 is arranged so as to form an enclosure E surrounding the reduction gear 10. This enclosure E is closed here upstream by seals at the level of a bearing allowing the passage of the fan shaft 4, and downstream by seals at the level of the passage of the LP shaft 3.

FIG. 1 shows part of a reduction gear 10 which can take the form of different architectures depending on whether certain pieces are fixed or in rotation. The input of the reduction gear 10 is connected to the LP shaft 3, e.g. via splines 7. Thus, the LP shaft 3 drives a planetary pinion called the sun gear 11. Classically, the sun gear 11, whose axis of rotation is coincident with the axis X of the turbomachine 1, drives a series of pinions called planet gears 12, which are equally spaced on the same diameter around the axis of rotation X. This diameter is equal to twice the operating distance between sun gear 11 and planet gears 12. The number of planet gears 12 is generally defined between three and seven for this type of application.

The set planet gears 12 are held together by a frame called a planet carrier 12. Each planet gear 12 rotates around its own axis Y and meshes with the ring gear 14.

At the output of the reduction gear 10, we have:

In an epicyclic configuration, the set of planet gears 12 drive in rotation the planet carrier 13 around the axis X of the turbomachine. The ring gear 14 is attached to the engine casing or stator 5 via a ring gear carrier 15 and the planet carrier 12 is attached to the fan shaft 4.

In a planetary configuration, the set of planet gears 12 is held by a planet carrier 12 which is attached to the engine casing or stator 5. Each planet gear drives the ring gear which is attached to the fan shaft 4 via a ring gear carrier 15.

Each planet gear 12 is freely mounted in rotation by means of a bearing 8, for example a rolling or hydrostatic bearing. Each bearing 8 is mounted on one of the axles 13a of the planet carrier 12 and all the axles are positioned in relation to each other by means of one or more structural frames of the planet carrier 12. There are a number of axles and bearings equal to the number of planet gears. For operational, assembly, manufacturing, inspection, repair or replacement purposes, the axles 13a and the frame may be separated into several pieces.

For the same reasons mentioned above, the toothing of a reduction gear can be separated into several propellers. In our example we will detail the operation of a multi-helix reduction gear 10 with one ring gear separated into two half ring gears:

A front half ring gear 14a consisting of a rim 14aa and a mounting half flange 14ab. On the rim 14aa is the front helix of the toothing of the reduction gear. This front helix meshes with that of the planet gear 12 which meshes with that of the sun gear 11.

A rear half-ring gear 14b consisting of a rim 14ba and a mounting half flange 14bb. On the rim 14ba is the rear helix of the toothing of the reduction gear. This rear helix meshes with that of the planet gear 12 which meshes with that of the sun gear 11.

The mounting half flange 14ab of the front ring gear and the mounting half flange 14bb of the rear ring gear form the mounting flange 14c of the ring gear. The ring gear 14 is attached to the ring gear carrier 15 by joining the mounting flange 14c of the ring gear and the mounting flange 15a of the ring gear carrier by means of a bolted assembly, for example. In the following, a half flange may be called a flange.

The arrows in FIG. 1 describe the oil supply in the reduction gear 10. The oil enters the reduction gear 10 from the stator part 5 into the dispenser 16 by different means, which will not be specified in this view because they are specific to one or more types of architecture. The dispenser 16 is separated into two parts, each of which is generally repeated by the same number of planet gears. The function of the injectors 17a is to lubricate the toothings, and the function of the arms 17b is to lubricate the bearings 8. The oil is supplied to the injector 17a and out the end 17c to lubricate the toothings. The oil is also supplied to each arm 17b and flows through the supply port 17d of the bearing 8. The oil then flows through the axle 13a into a buffer zone or zones 13b and out through orifices 13c to lubricate the bearings 8 of the planet gears.

Figure 3:
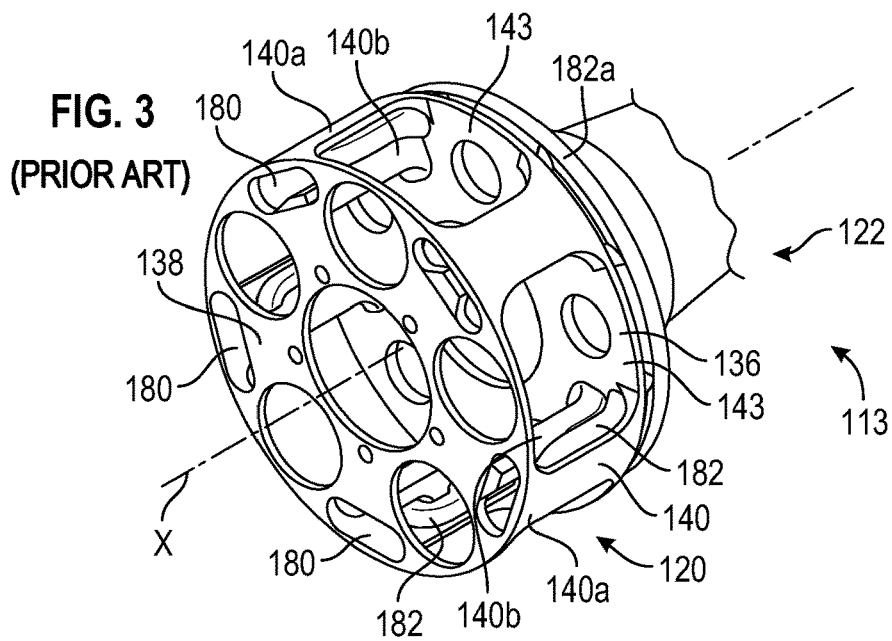
FIG. 3 is a perspective view of the set of a cage and cage carrier forming a planet carrier of reduction gear.
Figure 4:
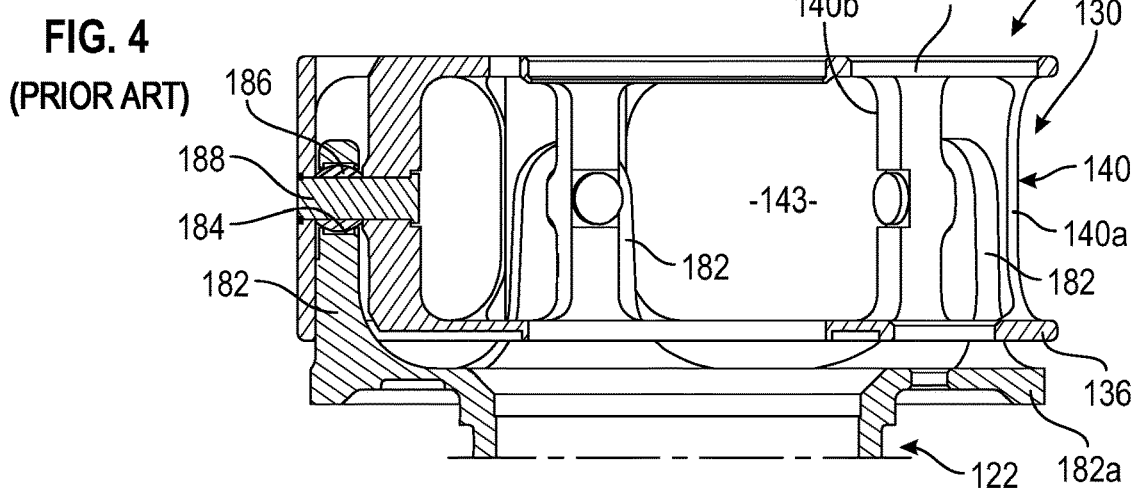
FIG. 4 is a partial axial sectional view of a part of the planet carrier of FIG. 3.
Figure 5:
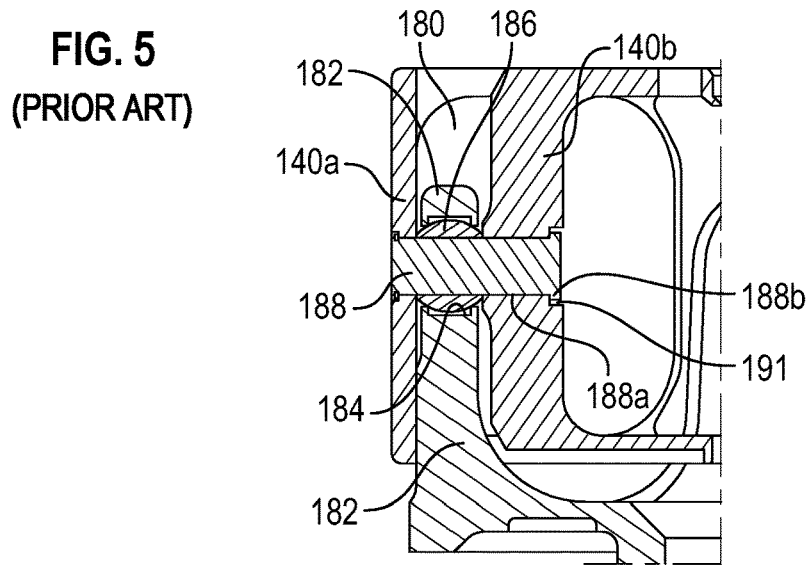
FIG. 5 is a detail view of FIG. 4.

In FIGS. 3 to 5, the elements already described in the foregoing are designated by the same references increased by one hundred.

FIGS. 3 to 5 depict a particular technology of planet carrier 113, the planet carrier comprising a cage 120 and a cage carrier 122 connected by ball joints connections.

The cage 120 comprises two radial annular walls 136, 138 which are parallel to each other and perpendicular to the axis X, and a cylindrical wall 140 which extends between the outer peripheries of these walls 136, 138.

The cylindrical wall 140 is here of the double-skinned type and comprises an outer skin 140a interrupted by the openings 143 and an inner skin 140b interrupted by the same openings 143. The outer skin 140a separated by five openings 143 forms five external bridges and the inner skin 140b separated by five openings 143 forms five internal bridges. Each pair of lower and upper bridges form a clevis to accommodate the finger 182 of the cage carrier 122. In other words, the bridges of each pair define between them a housing 180 for receiving a finger 182 of the cage carrier 122. The bridges provide the structural connection between the walls 136 and 138. Oblong openings 180 are made in at least one of the walls 136 and 138 so as to allow the finger 182 to pass between the internal and external bridges.

The cage 120 thus comprises an annular row of housings 180. These housings 180 receive the axial fingers 182 integral with a substantially radial annular wall 182a of the cage carrier 122. The wall 182a is located at an axial end of the cage carrier 122. The fingers 182 extend axially from the wall 182a and are engaged by axial translation in the housings 180.

Each finger 182 comprises, substantially in its middle, a ring 184 for mounting the ball joint 186 intended to be traversed by a cylindrical pin 188 carried by the cage 120.

The ring 184 has a substantially radial orientation with respect to the axis X. It has a generally cylindrical shape. The cage 120 and the ball 186 have a thickness, measured in a radial direction with respect to the axis X, which is less than the inter-bridge distance or the radial thickness of the oblong opening 180, so as to be able to be engaged in this housing concomitantly with the finger 182 supporting these pieces.

Each housing 180 is traversed by a pin 188 which has a substantially radial orientation with respect to the axis X. Each pin 188 comprises a cylindrical body 188a connected at an axial end, here radially internal, to an external annular collar 188b. The pin 188 is engaged here by radial translation from the inside through radial orifices of the bridges, its collar 188b being intended to come into radial support on a planar face 191 of the external bridge of the cage 120. After insertion of the pin 188 into the orifices of the bridges, until the collar 188b supports on the external bridge, the collar 188b is fixed to this bridge, for example by screwing.

As can be seen in FIGS. 3 to 5, the cage 120 is formed in a single piece and the housings 180 for receiving the fingers 182 and for mounting the connecting elements (ball joints 186 and pins 188) between the cage 120 and the cage carrier 122 are formed in the cage 120.

The present disclosure proposes an improvement to this technology in which the cage of the planet carrier is instead made in two parts, namely two shells, and in which the housings for receiving the connecting elements for the connection between the cage and the cage carrier are formed in these two shells.

Figure 6:
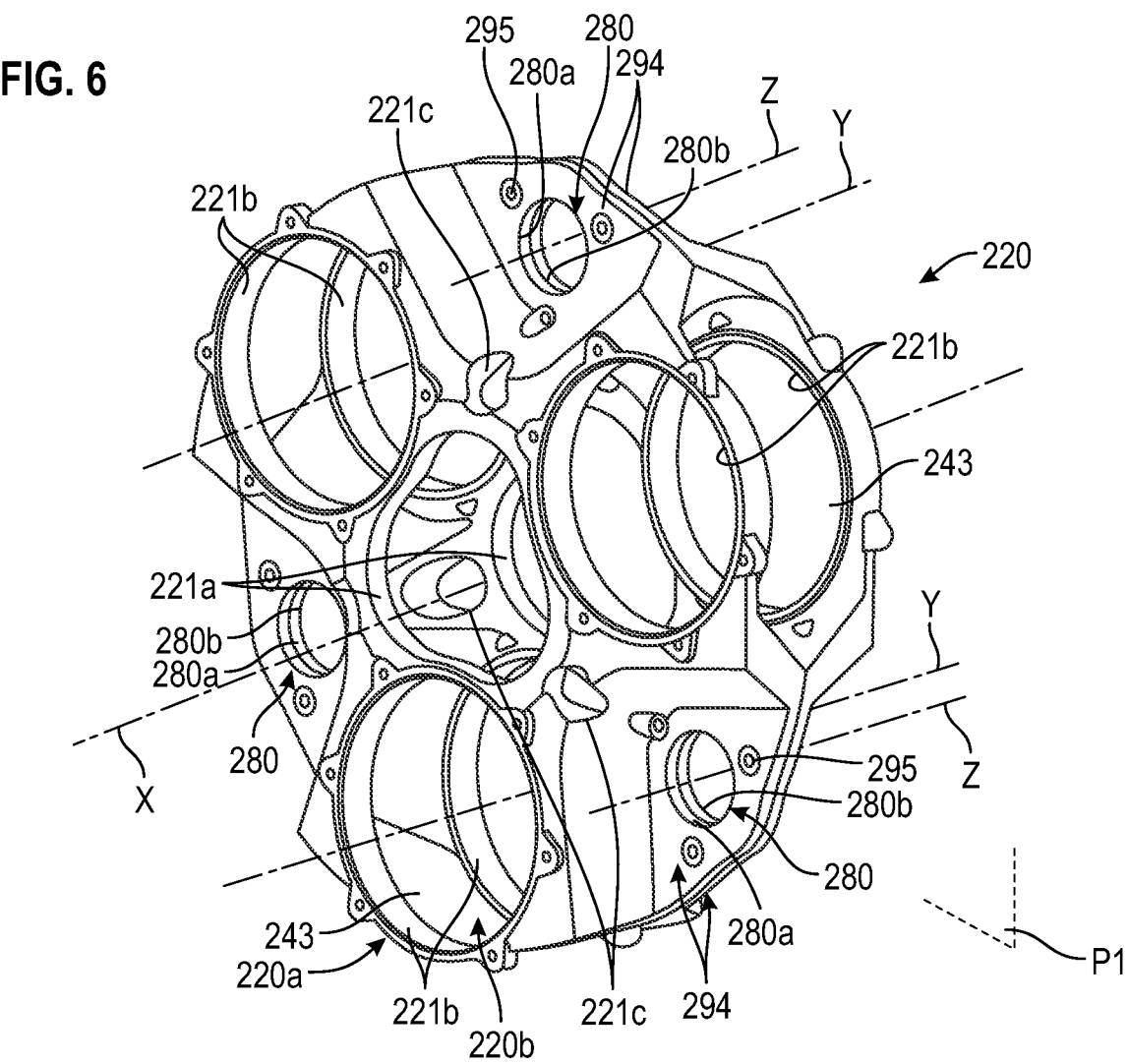
FIG. 6 is a schematic perspective view of a cage of a planet carrier according to the aspects of the present disclosure.
Figure 7:
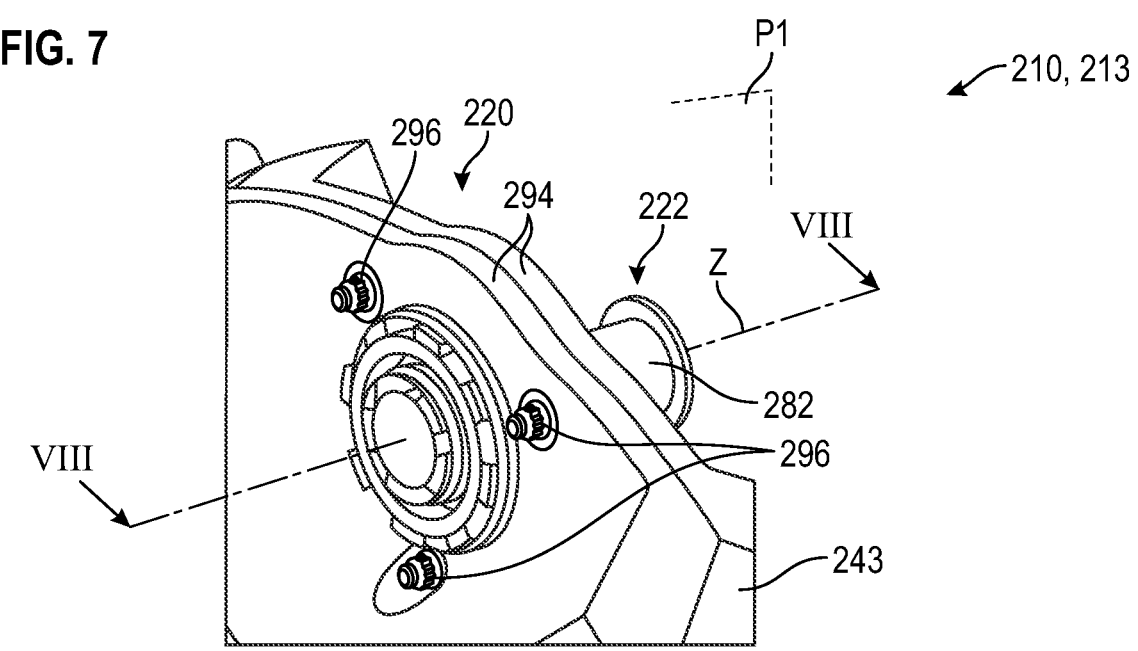
FIG. 7 is a schematic perspective view of a part of the cage of FIG. 6, in a housing of which are mounted elements for connecting this cage to a cage carrier.
Figure 8:
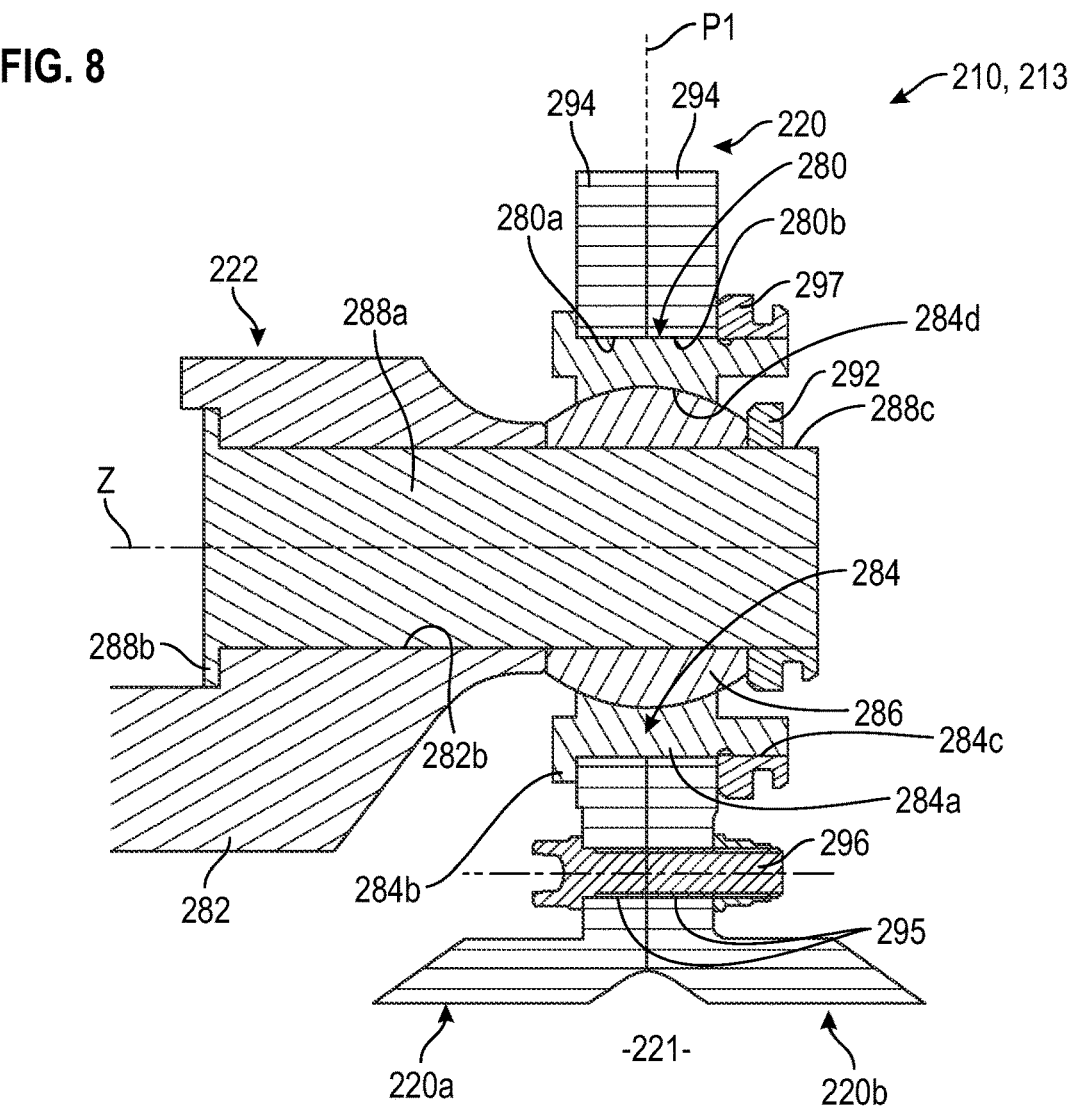
FIG. 8 is a schematic cross-sectional view along line VIII-VIII of FIG. 7.

FIGS. 6 to 8 represent a first embodiment of the disclosed subject matter.

In these and the following figures, the elements already described in the foregoing are designated by the same references increased by at least one hundred.

FIG. 6 shows the cage 220 alone with its two shells 220a, 220b. FIG. 7 shows a part of this cage 220 equipped with the elements for connecting the cage 220 to the cage carrier 222 and shows one of the fingers 282 of this cage carrier 222. FIG. 8 shows a cross-sectional view of these connecting elements. The cage carrier 222 of the reduction gear 210 according to the embodiment is similar to that described above with reference to FIGS. 3 to 5 and differs only in its fingers 282.

Generally speaking, the number of fingers 282 of the cage carrier 222 may be identical to the number of planet gears 12 of the reduction gear and is for example three in the example shown. The fingers 282 are evenly distributed around the main axis X of the reduction gear 210 and the planet carrier 213.

In the embodiment shown in FIGS. 6 to 8, each finger 282 carries a pin 288 with its axis Z parallel to the axis X.

Each pin 188 comprises a cylindrical body 288a connected at an axial end, located here on the side of the cage carrier 222 (on the left in FIG. 8), to an external annular collar 288b. The pin 288 is here engaged by axial translation through an axial orifice 282b of the finger 282 and its collar 288b is intended to come into axial support on a face of the finger 282 onto which the orifice 282b opens. A ball joint 286 is mounted on the body 288a of the pin 288 which comprises at its axial end opposite the collar 288b a thread 288c for screwing on a nut 292. The nut 292 is screwed onto the spindle 288 and ensures the fixing and tightening of the ball 286 against the finger 282. This clamping takes place parallel to the axis Z.

The shells 220a, 220b of the cage 220 shown in FIG. 6 are identical, i.e., they can be used either upstream or downstream of the reduction gear 210.

Figure 2:
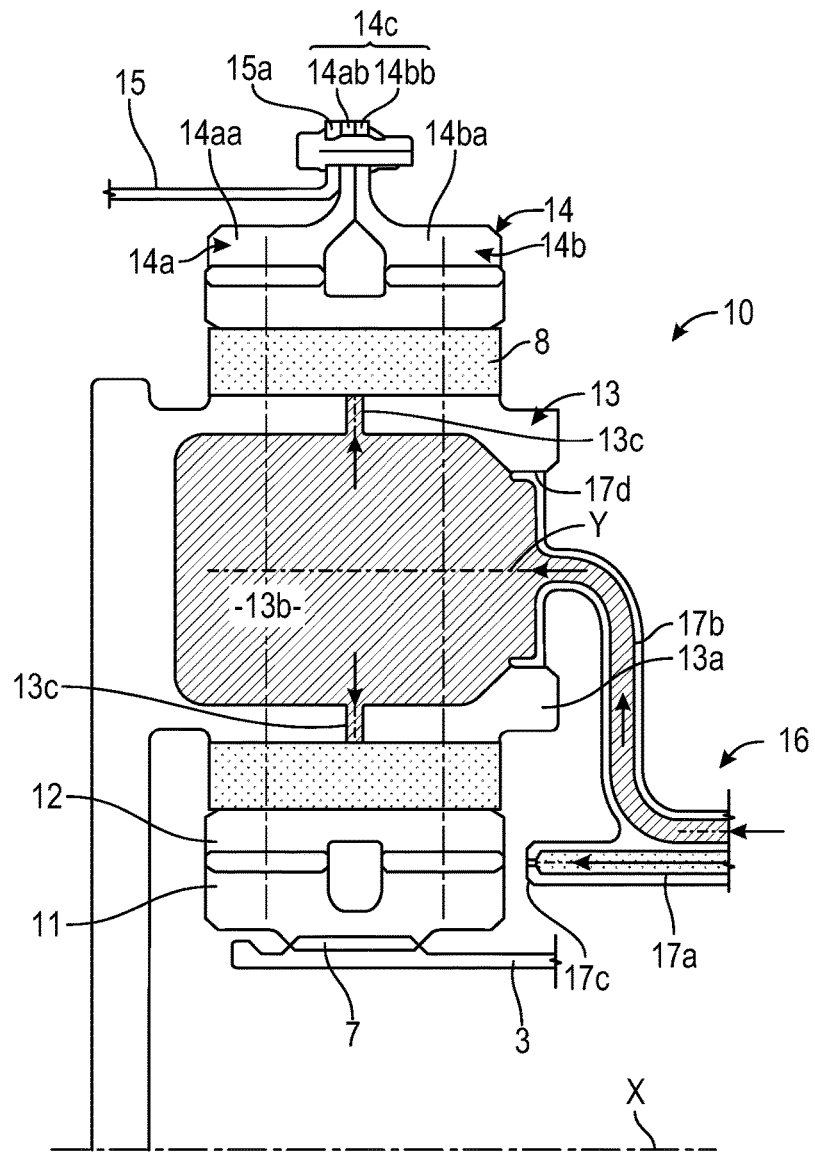
FIG. 2 is a schematic axial sectional view of an epicyclic reduction gear.

The cage 220 comprises an internal cavity 221 configured to contain the sun gear 11 and the planet gears 12 arranged around the sun gear 11 and meshed with the sun gear 11 as well as with the ring gear 14 intended to surround the cage 220 (see FIG. 2).

One part or axial half of the cavity 221 is defined by one of the shells 220a and the other part or axial half of the cavity 221 is defined by the other shell 220b.

Each of the shells 220a, 220b comprises a central orifice 221a of axis X which is used to mount the shaft 3 to be coupled with the sun gear 11.

Each of the shells 220a, 220b also comprises orifices 221b for mounting the planet gears 12 and in particular the axles 13a or the bearings 8 of the planet gears 12, three in number as mentioned above. At the level of these orifices 221b, the internal cavity 221 opens radially outwards to form the aforementioned openings 243 and allow the meshing of the planet gears 12 to mesh with the ring gear 14.

Each of the shells 220a, 220b also includes oil nozzle mounting orifices 221c (not shown).

Each of the shells 220a, 220b also comprises the aforementioned housings 280 for mounting the connecting elements with the cage carrier 222. These housings 280 are oriented parallel to the axis X. Each housing 280 comprises a first orifice 280a formed in a first of the shells 220a and a second orifice 280b formed in a second of the shells 220b. The orifices 280a, 280b are aligned along the axis Z parallel to the axis X.

The two shells 220a, 220b are axially fixed to each other and separated from each other by a plane P1 substantially perpendicular to the axis X.

In the example shown, the plane P1 is a plane of connection or axial support of the shells 220a, 220b, or even a plane of symmetry because the shells 220a, 220b are identical.

This symmetry is beneficial to ensure symmetrical deformation of the cage 220 under load and thus to maintain perfect alignment of the teeth of the sun gears 11 and the planet gears 12.

In addition, the orifices 221b for receiving the bearings 8 of the planet gears 12 and the housings 280 for mounting the connecting elements are all collinear. This last point is important to facilitate the machining of the cage 220 with a high positioning accuracy.

The shells 220a, 220b comprise at their outer periphery tabs 294 which are in axial support against each other and which are intended to form or replace the bridges 140 referred to above. Each shell 220a, 220b comprises three tabs 294 which are evenly distributed around the axis X and located between the orifices 221b for mounting the planet gear 12, and for example located just radially outside the orifices 221c for mounting the nozzles.

The housings 280 and the orifices 280a, 280b are formed in these tabs 294 and pass axially through them. These tabs 294 also comprise mounting passages 295 of means for fastening the shells 220a, 220b to each other. These fastening means are bolts 296 in the example shown.

Each of the tabs 294 comprises three passages 295 oriented parallel to the axis X. These passages 295 are evenly distributed around the axis Z of the housing 280 and the orifices 280a, 280b. Each bolt 296 comprises a screw, a head of which is axially supported on a face of one of the tabs 294 of the first shell 220a, and a threaded rod of which receives a nut tightened against a face of one of the tabs 294 of the second shell 220b (FIGS. 7 and 8). The bolts 296 allow the deformations undergone by the shells 220a, 220b to be taken up during operation. They hold the shells 220a, 220b tightly together and ensure that no fretting occurs. However, these bolts are optional.

The connecting elements which are mounted in the housings 280 are rings 284 which are intended to receive the ball joints 286 carried by the fingers 282 of the cage carrier 222.

As illustrated in FIG. 8, each of the rings 284 is engaged in the two orifices 280a, 280b of the shells 220a, 220b. Each ring 284 comprises a cylindrical body 284a connected at an axial end, located here on the side of the cage carrier (on the left in FIG. 8), to an external annular collar 284b. The ring 284 is here engaged by axial translation through the orifices 280a, 280b (and preferably shrunk into these orifices) and is intended to come into axial support on one face of one of the tabs 294 of the first shell 220a. The opposite axial end of the ring 284 comprises a thread 284c for screwing on a nut 297. The nut secures and clamps the ring 284 to the shells 220a, 220b. This tightening takes place parallel to the axis X.

The ring 284 comprises an internal recess 284d in the form of a sphere portion which is shaped to receive and cooperate by ball jointing with the ball joint 286 and thus allow a certain flexibility and in particular several degrees of freedom in the connection between the cage 220 and the cage carrier 222.

Figure 9:
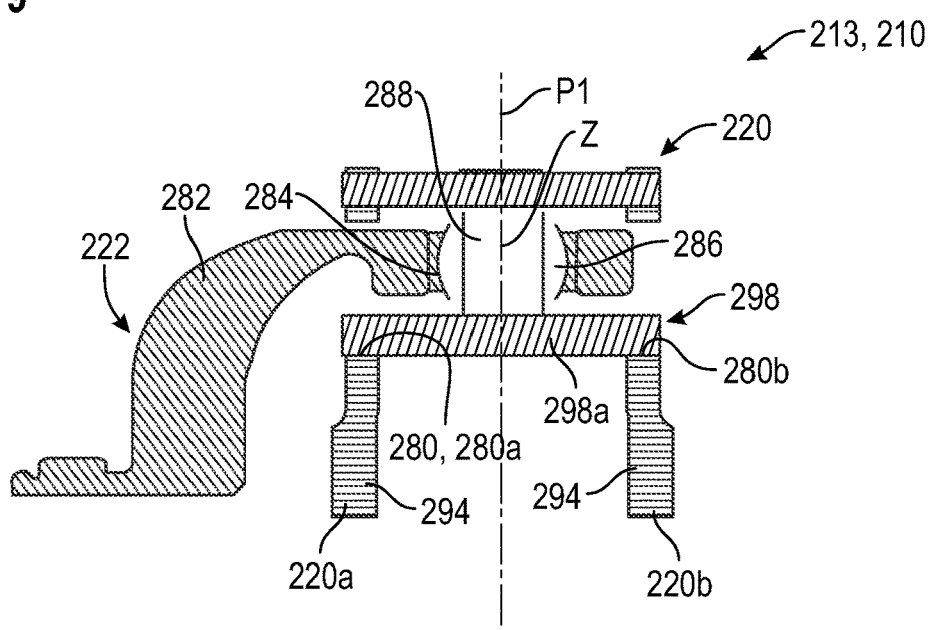
FIG. 9 is a schematic cross-sectional view similar to that of FIG. 8 and representing an alternative embodiment of the disclosed subject matter.
Figure 10:
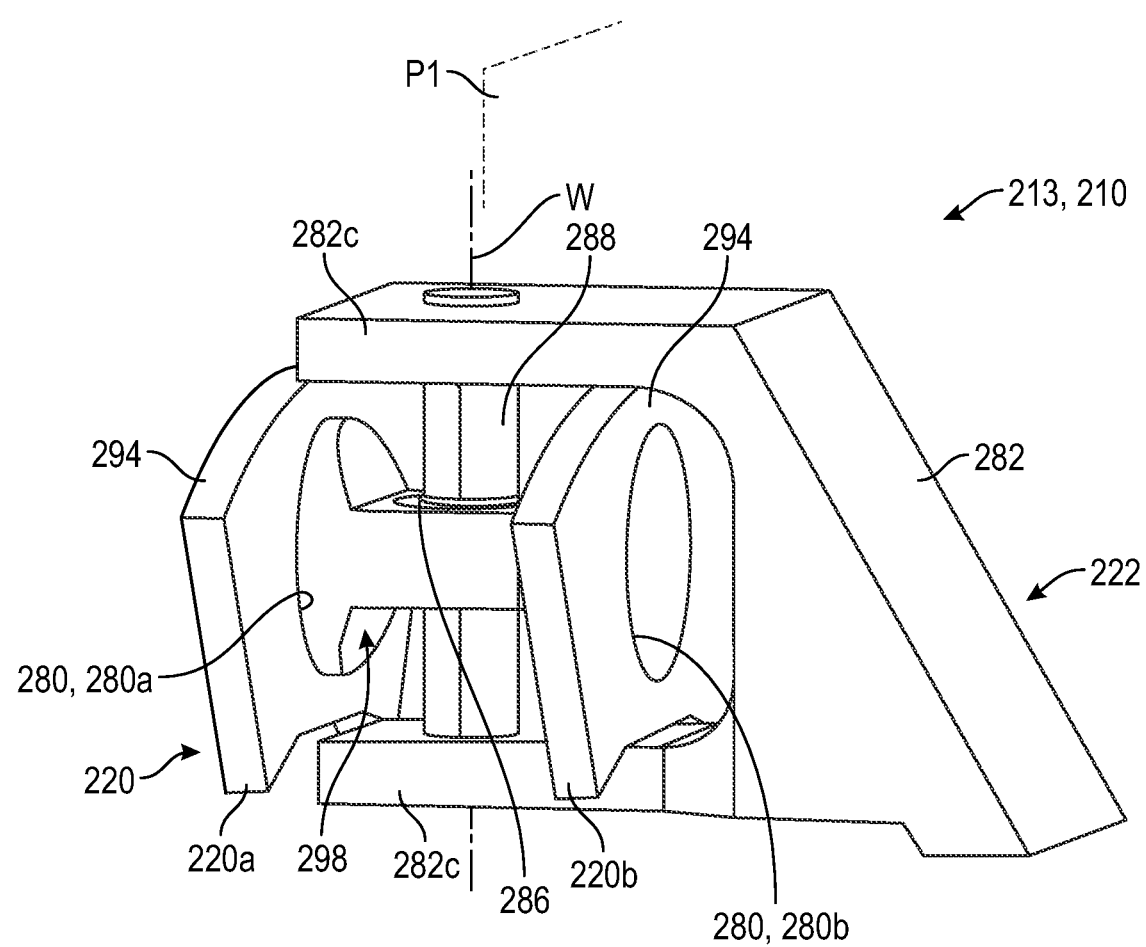
FIG. 10 is a schematic cross-sectional view similar to that of FIG. 8 and representing a further embodiment of the present disclosure.

FIGS. 9 and 10 illustrate alternative versions of the planet carrier 213 according to the disclosure.

In these two variants, the plane P1 which separates the two shells 220a, 220b of the cage 220 is not a connecting plane, although it may still be a plane of symmetry. Instead, the shells 220a, 220b are at an axial distance from this plane P1 and therefore at an axial distance from each other.

The shells 220a, 220b are partially shown and only their tabs 294 are visible in the drawings. It is therefore understood that the rest of the cage 220 is similar to what is shown in FIGS. 6 to 8 and described in the above.

In the case of FIG. 9, the tabs 294 of the shells 220a, 220b are at an axial distance from each other and extend parallel to each other and perpendicular to the axis X. The housings 280 and the orifices 280a, 280b receive inserts 298, preferably shrunk into these housings. Each insert 298 comprises a tubular cylindrical body 298a and a cylindrical pin 288 which is located inside and substantially in the middle of the body 298a. The body 298a extends along the axis Z and the pin 288 extends along a radial axis W. The ends of the pin 288 are integral with the body 298a. This insert 298 may be formed in one piece.

The fingers 282 each carry a ring 284a which surrounds a ball joint 286, the internal bore of which is traversed by one of the pins 288. The fingers are therefore engaged in the housings 280 and in the bodies 298a of the inserts 298.

In the case of FIG. 10, the tabs 294 of the shells 220a, 220b are axially spaced from each other and extend parallel to each other and perpendicular to the axis X. The housings 280 and the orifices 280a, 280b receive inserts 298, preferably shrink-fitted, which each carry a ball joint 286 whose internal bore is oriented radially with respect to the axis X (along an axis W).

The fingers 282 carry pins 288 which pass through the bores of the ball joints 286. These pins 288 are oriented radially with respect to the axis X and are here connected by their two opposite ends to the corresponding finger 282. For this purpose, each of the fingers 282 has an end with a C-shape, the branches 282c of which are connected to the ends of the pin 288 that it carries.

The variants in FIGS. 9 and 10 allow the planet carrier 213 to be more isostatic while maintaining potential symmetry of the shells 220a, 220b of the cage 220, and the colinear orifices 280a, 280b and housings 280.

The embodiments of the disclosed subject matter in which an exclusive property or privilege is claimed are defined as follows:

1. A planet carrier for a speed reduction gear of a turbomachine, the planet carrier having a main axis X and comprising:
   a cage carrier comprising an annular row of axial fingers about the axis X, which carry first connecting elements; and
   a cage comprising:
      an internal cavity configured to contain a central sun gear of axis X of rotation and an annular row of planet gears disposed about the axis X and meshed with said sun gear and with a ring gear for surrounding the cage, housings at a periphery of said cage,
      second connecting elements mounted in said housings and cooperating with the first connecting elements to form connections between the cage carrier and the cage, which allow at least one degree of freedom between the cage carrier and the cage, and
      two shells which are axially fixed to each other and separated from each other by a plane, said housings being formed respectively in said shells, each of said housings comprising a first orifice formed in a first of the shells and a second orifice formed in a second of the shells, the first and second orifices being aligned,
   wherein the shells comprise at their external periphery radial tabs extending perpendicularly to the main axis X and to axes tangent to a circumference centered on said main axis X, said radial tabs being in axial support against each other or axially spaced from each other and in which said first and second orifices are formed respectively, and
   wherein the radial tabs have a dimension along the main axis which is lower than a dimension of each shell along the main axis.

2. The planet carrier according to claim 1, wherein said plane is a plane of connection or axial support for the shells.

3. The planet carrier according to claim 1, wherein the shells are identical and said plane is also a plane of symmetry.

4. The planet carrier according to claim 1, wherein the tabs are in axial support against each other and are axially clamped together by screws which extend parallel to said axis X and pass through passages of these tabs.

5. The planet carrier according to claim 4, wherein the connections between the cage carrier and the cage are of the ball joint type, said fingers carrying ball joints which are housed in rings mounted in said first and second orifices.

6. The planet carrier according to claim 5, wherein a first nut is screwed to an axial end of each of said fingers and secures the ball joint carried by that finger, and a second nut is screwed to a free end of the ring for mounting that ball joint and secures that ring to the shells.

7. The planet carrier according to claim 5, wherein each of said ball joints has an axially or radially oriented major axis.

8. The planet carrier according to claim 1, wherein the radial tabs are axially spaced apart and wherein the connections between the cage carrier and the cage are of the ball joint type, said fingers carrying rings in which are housed ball joints carried by inserts mounted in said first and second orifices.

9. The planet carrier according to claim 7, wherein the connections between the cage carrier and the cage are of the ball joint type, said fingers carrying ball joints which are housed in rings carried by inserts mounted in said first and second orifices.

10. The planet carrier according to claim 8, wherein said inserts are shrunk into said first and second orifices.

11. A mechanical reduction gear for an aircraft turbomachine, comprising a planet carrier according to claim 1, a sun gear mounted in said cavity and centered on said axis X, a ring gear extending around the sun gear, and planet gears mounted in said cavity and meshed with the sun gear and the ring gear.

12. A turbomachine, comprising a reduction gear according to claim 11.

13. A planet carrier for a speed reduction gear of a turbomachine according to claim 1,
   wherein the shells further comprise:
   an annular row of planet gears mounting orifices about the axis X,
   an annular row of oil nozzle mounting orifices about the axis X, each of the oil nozzle mounting orifices being located between the planet gear mounting orifices, and
   wherein the radial tabs are located radially outside the oil nozzle mounting orifices.

* * * * *